United States Patent [19]

Hammer

[11] Patent Number: 4,757,784
[45] Date of Patent: Jul. 19, 1988

[54] METHOD AND MEANS FOR CIRCULATING FLUID TO LIVESTOCK

[76] Inventor: Floyd V. Hammer, R.R. 1, Union, Iowa 50258

[21] Appl. No.: 908,740

[22] Filed: Sep. 18, 1986

[51] Int. Cl.$^4$ ................................. A01K 5/02
[52] U.S. Cl. ........................ 119/75; 119/72; 251/339
[58] Field of Search ............... 119/71, 72, 73, 74, 119/75; 251/339

[56] References Cited

U.S. PATENT DOCUMENTS

| | | | |
|---|---|---|---|
| 3,086,500 | 4/1963 | Spire | 119/74 |
| 3,285,226 | 11/1966 | Schuler | 119/71 |
| 4,248,175 | 2/1981 | Kilstofte | . |
| 4,307,682 | 12/1981 | Bollman | 119/75 |
| 4,402,343 | 9/1983 | Thompson et al. | 257/339 X |
| 4,470,374 | 9/1984 | Upperman | 119/72 |

FOREIGN PATENT DOCUMENTS 1536662 12/1978 United Kingdom ............ 251/339
596195 3/1978 U.S.S.R. ........................ 119/72

Primary Examiner—David A. Scherbel
Assistant Examiner—Richard E. Chilcot, Jr.
Attorney, Agent, or Firm—Zarley McKee, Thomte, Voorhees & Sease

[57] ABSTRACT

The device for delivering fluid to livestock comprises a plurality of demand actuated drinker units which can be actuated by animals. Each drinker unit is connected to a vertical conduit, and the upper end of the vertical conduits are connected to a horizontal conduit. Fluid is circulted from a reservoir through the horizontal conduit and back to the reservoir. Gravity causes fluid to flow downwardly through the vertical conduits to the drinker units, but the constant recirculation of fluid through the upper conduit prevents the fluid from remaining at rest and spoiling. The system includes a fresh water supply which can be used to inject fresh water into the system or for the purposes of flushing the system.

14 Claims, 2 Drawing Sheets

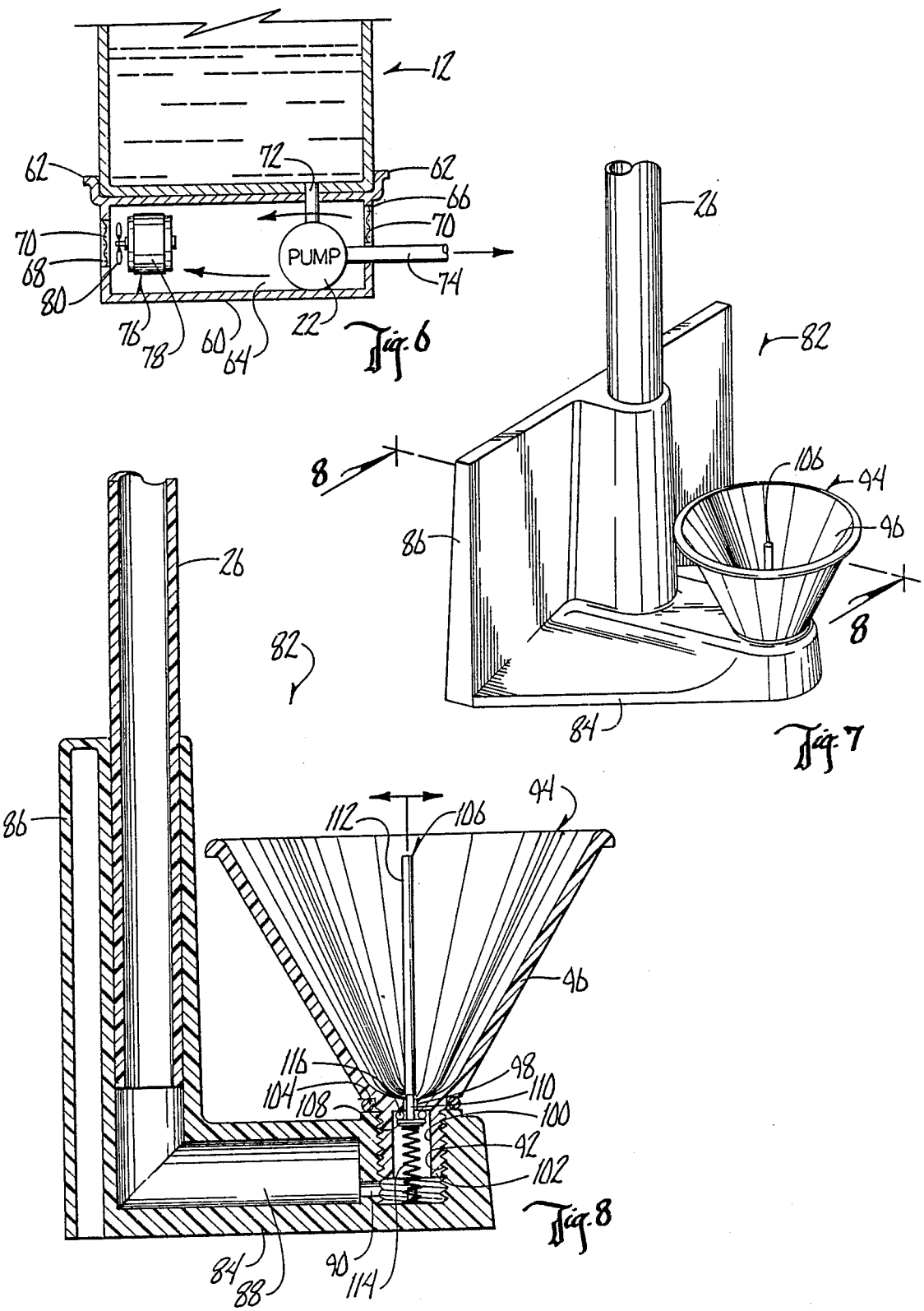

METHOD AND MEANS FOR CIRCULATING FLUID TO LIVESTOCK

BACKGROUND OF THE INVENTION

The present invention relates to a method and means for circulation fluid to livestock.

Many livestock feeding operations utilize automatic feeding systems for providing feed to the livestock. In the case of younger animals, the feed is sometimes provided in a liquid form, as for example, in the case of milk replacer which replaces the animal's mother's milk. With respect to adult animals, nutritive fluid can be used as a dietary additive for the animal's diet.

One problem encountered in providing automatic fluid circulation to the various animals is that the nutritive fluid may become stagnant and spoil in the system. It is therefore desirable to provide continuous circulation to the liquid nutritive fluid so that it cannot become stagnant or spoil.

Therefore, a primary object of the present invention is the provision of an improved method and means for circulating fluid to livestock.

A further object of the present invention is the provision of an improved method and means for circulating fluid to livestock wherein the fluid may be constantly circulated so as to minimize the likelihood that it will become stagnant or spoil.

A further object of the present invention is the provision of a method and means which minimizes the amount of fluid which is left standing in the system during the time that the animals are not drawing the fluid out of the system.

A further object of the present invention is the provision of a method and means which includes valving permitting the introduction of a fresh water supply into the reservoir of the unit so that water can be circulated through the unit once the nutritive fluid in the reservoir is depleted.

A further object of the present invention is the provision of a method and means which permits fresh water to be introduced into the system so as to provide a pressurized water system for providing fresh water to the livestock.

A further object of the present invention is the provision of a method and means which includes valving to permit the fresh water to be injected into the system so as to flush the system.

A further object of the present invention is the provision of a system which includes a pump located outside the reservoir so as to minimize the heat transfer from the pump to the milk and thereby reduce spoilage of the milk.

A further object of the present invention is the provision of a system which includes a cooling system for cooling the pump so as to keep the temperature of the pump as low as possible and thereby minimize the exposure of the milk to high temperatures which would enhance spoiling of the milk.

A further object of the present invention is the provision of a system which is economical to manufacture, durable in use and efficient in operation.

SUMMARY OF THE INVENTION

The present invention in its simplest form utilizes a reservoir having a first conduit leading from the reservoir to an elevated or upper conduit positioned above the area where the livestock is to be supplied. A second conduit is connected to the upper conduit and returns to the reservoir. Extending downwardly from the upper conduit are a plurality of upstanding or vertical conduits which are each connected at their lower ends to a drinker unit having a demand valve thereon. These drinker units are available in a variety of forms commercially, and operate upon the principle that the animal can actuate and open the valve so as to receive fluid from the system.

Nutritive fluid is pumped through the system, and is permitted to fall by gravity or pressure (preferably a low pressure, approximately 12 p.s.i.) from the upper conduit downwardly through the upstanding conduits to the drinker units. Any fluid not being drawn out of the drinker units continues to circulate through the upper conduit back to the reservoir. Thus, continuous circulation of the fluid is provided, and the fluid can be supplied to the animal at any time merely as a result of the animal actuating the demand valve on the drinker unit. The vertical upstanding conduits are preferably of very small diameter on the order of one-quarter inch so as to minimize the amount of fluid within each of the upstanding conduits at any given time.

A valving system is provided within the present invention to permit the introduction of a fresh water supply into the system. The valving permits the fresh water to be introduced into the reservoir or tank whenever the level of nutritive fluid within the tank reaches a predetermined minimum level. This can be accomplished by means of a float valve within the reservoir which opens and admits fresh water when the fluid within the reservoir drops below a predetermined level. This permits the water to be circulated through the system in the same fashion as described above for the nutritive fluid.

The valving also permits the fresh water supply to be introduced to the system in the form of a closed pressurized system. This is accomplished by introducing fresh water directly into the upper conduit and by closing off a valve between the upper conduit and the reservoir tank. This permits the fresh water supply to be introduced under pressure into the upper conduit, and provides a closed pressurized system which does not circulate except when the livestock actuate the demand valves on the drinker units.

The valving also permits fresh water to be introduced directly into the conduit circuitry so that it can be pumped through the system to flush the system. A drain valve is provided in the reservoir tank for draining fluid away from the reservoir during the flushing operation.

A modified form of the invention positions the pump in an air filled cavity below the reservoir containing the milk. A fan is positioned in the air cavity next to the pump and draws fresh air across the pump during its operation. This keeps the temperature of the pump cool, and reduces the heat transfer from the pump to the milk which it is pumping. Reduction of the heat transfer from the pump to the milk minimizes and slows down the speed at which the milk will spoil.

A further modification of the present invention relates to a special design for a drinker unit which can be used in combination with the circuitry of the present invention. The drinker unit includes a cone shaped reservoir having a pin-like valve positioned in an opening in the bottom of the reservoir. The pin-like valve is held in place by means of an O-ring which is positioned between the valve and the reservoir opening, and which also includes a spring yieldably urging the valve upwardly against the O-ring. The valve includes a pin-like projection extending upwardly through the opening into the reservoir. When the animal engages the upstanding pin and urges it in a horizontal direction, the tilting action of the valve cooperates with the O-ring to open the valve and permit milk to be introduced into the reservoir. This modified form of the invention includes two O-rings, the first of which is between the bottom of the cone-shaped container and the connection of that container with the conduits supplying the fresh milk. The second O-ring is located between the pin-like valve and the perimeter of the valve opening in the bottom of the container. These two O-rings are important to the satisfactory operation of the present invention so that the valve remains closed at all times except when the animal deflects the upstanding pin in a horizontal direction.

BRIEF DESCRIPTION OF THE DRAWINGS

FIG. 6 is a sectional view of a modified form of the invention.

FIG. 7 is a pictorial view of a further modified form of the invention.

FIG. 8 is a sectional view taken along line 8—8 of FIG. 7.

DETAILED DESCRIPTION OF THE PREFERRED EMBODIMENT

Figure 1:
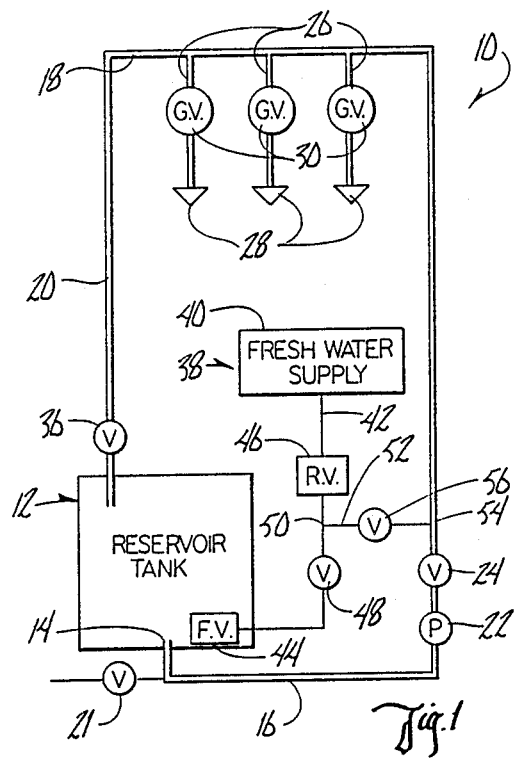
FIG. 1 is a schematic view of the present invention showing the circulation of fluid with double lines and showing the closed conduits with single lines.

Referring to the drawings, the numeral 10 generally designates the circulation system of the present invention. System 10 includes a reservoir tank 12. Tank 12 includes an outlet 14 which is in communication with a first primary conduit 16. First primary conduit 16 leads to an upper or elevated conduit 18 which is turn is connected to a return conduit 20 which leads back to reservoir tank 12.

First primary conduit 16 is provided with a drain valve 21 which is normally closed, but which can be opened to permit the draining of fluid from reservoir tank 12. A pump 22 is also provided in first primary conduit 16. Immediately above pump 22 is a first primary valve 24 which can be opened or closed in conventional fashion.

Extending downwardly from and connected in fluid communication with upper conduit 18 are a plurality of upstanding conduits 26, each of which extends downwardly to its lower end where it is connected to a drinker unit 28. A valve 30 is provided in each upstanding conduit 26 and can be closed to shut off fluid flow downwardly to the drinker unit 28.

Figure 5:
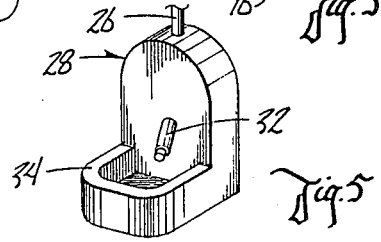
FIG. 5 illustrates a drinker unit which may be used with the present invention.

FIG. 5 illustrates a typical drinker unit 28. Many different types of drinker units are available commercially, and the unit shown in FIG. 5 is illustrative of one of the types of drinker units which can be used in applicant's invention. Drinker unit 28 includes a demand valve 32 which is in connection with upstanding conduit 26. This demand valve is actuatable by livestock to cause the opening of valve 32 to permit fluid flow from conduit 26 into a trough or container 34. Valve 32 may be of the nipple type commonly used with livestock which permits the animal to receive the fluid directly from the nipple valve 32.

Return conduit 20 includes a second primary valve 36 which is normally open, but which can be closed to prevent the return flow of fluid from conduit 20 to reservoir tank 12.

A fresh water system is generally designated by the numeral 38 and includes a pressurized source of fresh water designated by the numeral 40. Connected to fresh water supply 40 is a water line 42 which is connected to a float valve 44 within reservoir 12. Within line 42 is a pressure reducing valve 46 which performs the function of reducing the pressure from a normal water supply system to a substantially reduced pressure. While the reduced pressure may vary, an example of a preferred pressure would be approximately 12 pounds per square inch.

Also within water line 42 is a first water valve 48 which may be opened and closed. Between water valve 48 and pressure reducing valve 46 is a T-connection 50 which is connected to one end of a second water line 52. Second water line 52 is connected by means of a T-connection 54 to first primary conduit 16. It should be noted that T-connection 54 is located above first primary valve 24. Provided within second water line 52 is a second water valve 56.

Valves 48, 56 and 24 are shown in the drawings to be separate from one another. However these valves may be combined into a single three way valve without detracting from the invention.

FIG. 1 illustrates the use of the invention for the purpose of circulating nutritive fluid to the various drinker units 28. This is accomplished by closing valves 48 and 56. Float valve 44 is normally in a closed position, and only opens when the fluid level within reservoir tank 12 drops below a predetermined level. By closing valves 48, 56, it is possible to shut off any supply of fresh water to the system. Valve 21 is also kept in a closed position to prevent the drainage of nutritive fluid from reservoir tank 12.

The remaining valves 24 and 36 are left open. The gate valves 30 may be left open, or certain ones of these gate valves can be closed as may be desired.

With the reservoir tank 12 full of nutritive fluid, pump 22 is actuated, and fluid flow is caused through first primary conduit 16, upper primary conduit 18, and return conduit 20.

When an animal actuates demand valve 32 of drinker unit 28, fluid within upper conduit 18 is permitted to flow by gravity downwardly through upstanding conduit 26 and outwardly through valve 32 for consumption by the animal. It is important that upper conduit 18 be maintained in an elevated position above the drinker units 28 so that fluid can flow by gravity downwardly through conduits 26. This arrangement permits the fluid to be continually circulated through upper conduit 18, and it is only directed downwardly to the animals when the demand valve 32 is open.

Furthermore, because of the small diameter of upstanding conduits 26, there is a minimum amount of nutritive fluid which is stationary within the system when all the demand valves 32 are closed. This minimizes the danger of spoilage or decomposition of the nutritive fluid. The fluid within conduit 16, 18 and 20 continues to circulate, returning to the reservoir tank and being pumped out again by pump 22.

The continuous circulation of the fluid through the system is also important to the present invention because it helps keep the nutritive fluid ingredients in suspension.

Figure 2:
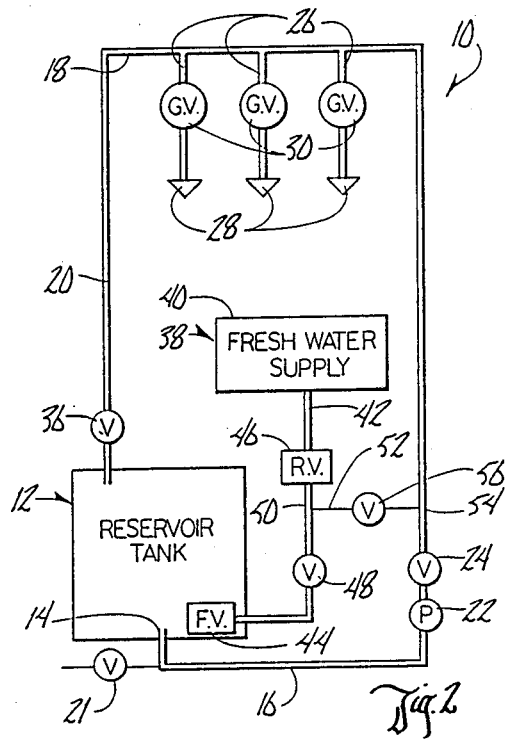
FIG. 2 is a view similar to FIG. 1 showing the fluid flow with double lines and showing the conduits without fluid flow with single lines.

FIG. 2 shows an alternative arrangement of the valving in system 10. The purpose of the arrangement in FIG. 2 is to permit the introduction of a fresh water supply when the nutritive fluid within reservoir tank 12 has been depleted so that the fluid level drops below a predetermined level. In order to provide valving for this system, the operator must close valve 56 and close valve 21. Valves 36, 48 and 24 are left open. Assuming the reservoir is initially full of nutritive fluid, pump 22 is actuated and fluid is circulated through first primary conduit 16, elevated primary conduit 18, and return primary conduit 20 similar to the circulatory pattern shown in FIG. 1.

However, when the fluid level within reservoir tank 12 reaches a sufficiently low level to cause float valve 44 to open, fresh water is introuduced into reservoir tank 12 from supply 40. This causes pump 22 to commence pumping water through the system in the same fashion that the nutritive fluid was initially pumped through the system. Thus, the livestock can actuate valve 32 to provide nutritive fluid until the nutritive fluid has been fully consumed, then the demand valves 32 will provide fresh water emanating from fresh water source 40.

Figure 3:
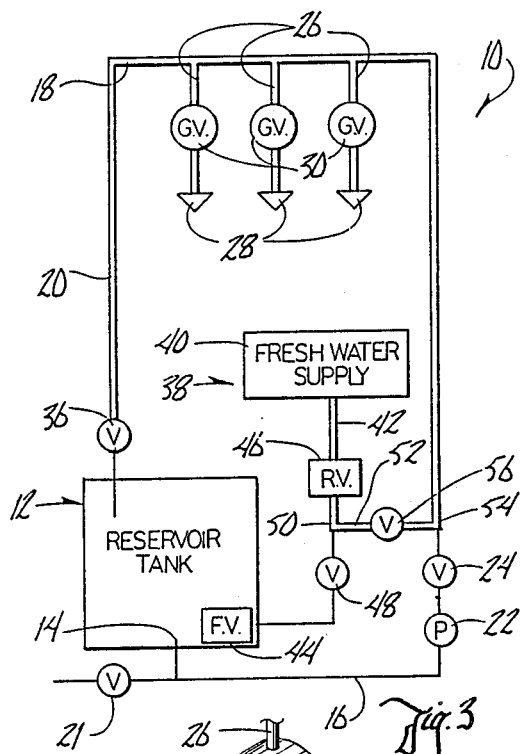
FIG. 3 is a schematic view similar to FIGS. 1 and 2 showing an alternative method of fluid flow.

Referring to FIG. 3, a further variation in the circulatory system can be provided. The circulatory pattern shown in FIG. 3 may be used for providing a closed pressurized water system for the livestock. In this configuration, valves 36, 48, 24, and 21 are closed, and valve 56 is opened. Because valves 24 and 36 are closed, a closed conduit is provided commencing with valve 24 and extending upwardly therefrom through elevated conduit 18 and return conduit 20 down to the point where valve 36 is located. Because valve 56 is open, fresh water is introduced under pressure into the closed system just described. This causes pressurized water to be maintained in elevated conduit 18 as well as in the upstanding conduits 26. Thus, when the animal actuates demand valve 32, fresh water is provided.

Figure 4:
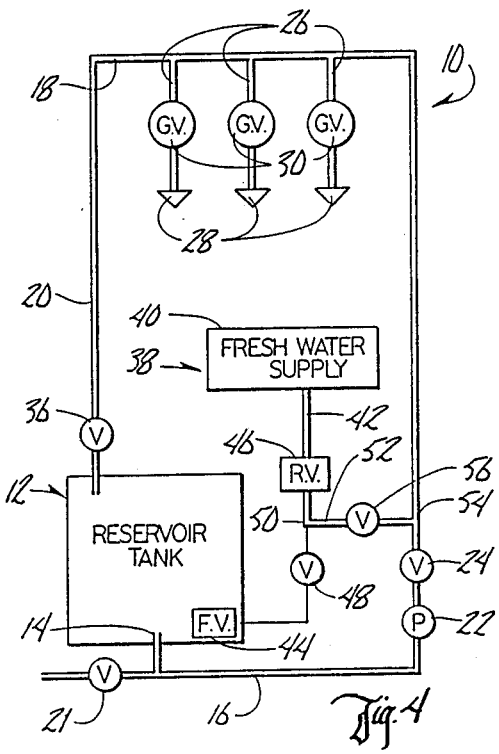
FIG. 4 is a schematic view similar to FIGS. 1, 2 and 3 showing a further modified circulation route in the system.

The circulatory system shown in FIG. 4 illustrates an arrangement which permits the flushing of the system. In this arrangement valve 48 is closed, but valves 24, 56, 36 and 21 are all opened. This arrangement can be provided so as to permit flushing of the system. Fresh water is introduced through valve 56 into first primary conduit 16. It is then circulated up through elevated conduit 18 and is circulated to return downwardly through valves 36 into the reservoir tank 12. The water exiting from the outlet 14 of reservoir tank 12 is permitted to drain through valve 21. This permits a flushing of the system when desired.

Referring to FIG. 6, a modified form of the invention is shown wherein the pump 22 is mounted below the container 12. Pump 22 is contained within a housing 60 which includes flanges 62 sized and shaped to matingly fit with the bottom of reservoir tank 12. Housing 60 encloses a compartment 64 having an inlet opening 66 and an outlet opening 68 therein. Openings 66, 68 are each provided with a suitable screen 70. Pump 22 is connected to the container 12 by means of an inlet conduit 72. An outlet conduit 74 extends from pump 22 and extends outwardly through housing 60. Conduit 74 may be connected to the circuitry of the present invention as reflected in FIG. 3.

Also mounted within compartment 64 is a fan assembly 76 comprising a motor 78 and a fan blade 80.

The modification shown in FIG. 6 provides the important result of keeping the pump outside the container 12 where the milk is stored. Prior devices such as shown in previous U.S. Pat. No. 4,248,176, utilized submersible pumps which were contained within the container 12. These prior devices were undesirable because the pump during operation imparts heat to the milk within the container, thereby inducing spoilage in the milk. The present invention avoids this problem by placing the pump outside the container.

The present invention further minimizes the heat which is imparted to the milk by utilizing the fan assembly 76. When assembly 76 is turned on, it draws air inwardly through inlet opening 66 and forces air outwardly through outlet opening 68. This provides a continuous cooling flow of air across pump 22 so as to cool pump 22 and minimize the heat which it imparts to the milk being pumped therethrough.

Referring to FIGS. 7 and 8, a preferred form of drinker unit is shown and is designated by the numeral 82. Drinker unit 82 includes a base 84 having an upstanding vertical support flange 86. Conduit 26 extends downwardly into upstanding flange 86 and is in communication with an internal feed passageway 88 within base 84. Passageway 88 is in communication with an inlet aperture 90 which provides communication into the threaded female receptacle 92 in base 84.

A cone-shaped drinking cup 94 includes tapered walls 96, and a valve opening 98 located at the bottom thereof. Valve opening 98 is in communication with a counterbore 100 formed in a threaded base 102 of cup 94. Threaded base 92 is threadably received within threaded female receptacle 92. It will be noted that the lower end of threaded base 102 is positioned in upward spaced relationship from the bottom of the female receptacle 92 so that fluid communication is provided from feed passageway 88 through inlet aperture 90, counterbore 100 and valve opening 98 into the interior of cup 94.

An elastomeric O-ring 104 is sealingly fitted around the upper end of threaded base 102 of cup 94 and provides sealing engagement between cup 94 and the upper end of female receptacle 92.

Fitted within valve opening 98 is a valve member 106 having a flat head 108 at its lower end. Valve member 106 also has a reduced diameter portion 110 which is located adjacent the flat head 108 and which extends through the valve opening 98. The upper end of valve member 106 comprises an upstanding pin 112.

Valve member 106 is urged upwardly by means of a spring member 114 which engages the bottom of female receptacle 92 at its lower end and which engages the undersurface of flat head 108 at its upper end. Surrounding the reduced diameter portion 110 and compressed between flat head 108 and the upper end of counterbore 100 is a second elastomeric O-ring 116 which provides a sealing engagement between flat head 108 and the periphery of valve opening 110.

Valve member 106 is shown in its normal position in FIG. 8, and in this position the O-ring 116 prevents fluid communication between the counterbore 100 and the interior of cup 94 through valve opening 98. However, when an animal places its snout within cup 94, it causes the valve member 106 to be tilted out of its vertical position, and this tilting action causes the flat head at the bottom of valve member 106 to also tilt and release pressure from one side of O-ring 108. This permits fluid to pass upwardly through valve opening 98 into cup 94. The fluid pressure within counterbore 100 is a relatively low pressure, usually no greater than what would be created by gravity.

When the animal removes its snout from the cup 94, the spring 114 causes valve member 106 to reassume its vertical position, and in this position the O-ring 116 seals off counterbore 100 so that fluid cannot pass into cup 94 through valve opening 98.

O-ring 104 is believed to be important to the invention inasmuch as it prevents seepage of milk or liquid feed from the threaded connection between cup 94 and base 84. Also, O-ring 116 is important to the present invention in that it provides a removable seal around valve opening 98. The O-ring is important to permitting the opening of valve opening 98 in response to tilting action of valve member 106 while at the same time permitting the valve opening to be resealed when the valve member 106 reassumes its vertical position.

Thus, it can be seen that the device accomplishes at least all of its stated objectives.

What is claimed is:

1. A device for delivering nutritive fluid to at least one animal, said nutritive fluid being capable of spoiling when left standing without refrigeration, said device comprising: a fluid reservoir for containing said nutritive fluid;
    at least one drinker unit, said drinker unit having a fluid inlet and an animal actuatable valve means connected to said inlet and normally being in a closed position closing off said inlet, said animal actuatable valve means being yieldably movable from said closed position to an open position in response to being actuated by an animal;
    primary conduit means comprising a first primary conduit connected to said reservoir, an upper primary conduit connected to said first primary conduit and extending above said drinker unit, and a second primary conduit connected to said upper primary conduit and returning to said reservoir;
    an upstanding conduit having an upper end connected to said upper primary conduit and extending downwardly therefrom to terminate in a lower end connected to said inlet of said drinker unit, said connection of said upper end of said upstanding conduit to said upper primary conduit being the only fluid connection between said upstanding conduit and said primary conduit means;
    said upstanding conduit having a diameter which is substantially smaller than the diameter of said first, upper and secondary primary conduits;
    pump means connected to said primary conduit means for circulating fluid from said reservoir through said first, upper and second primary conduits and back to said reservoir, whereby at least a portion of said fluid will fall by gravity from said upper primary conduit downwardly through said upstanding conduit and outwardly through said drinker unit whenever said animal actuatable valve is in said open position, and said fluid will be prevented from flowing through said upstanding conduit and said drinker unit whenever said animal actuatable valve is in said closed position, said fluid being free to circulate through said primary conduit means when said animal actuatable valve is in both said closed position and said open position;
    said primary conduit means and said upstanding conduit being closed to the atmosphere except when said actuatable valve means of said drinker unit is in said open position, whereby said primary conduit means and said upstanding conduit protect said nutritive fluid therein from exposure to contamination from the atmosphere.

2. A device according to claim 1 comprising a plurality of said drinker units, each of said drinker units including a fluid inlet and an animal actuatable valve means identical to said first mentioned fluid inlet and animal actuatable valve means, a plurality of upstanding conduits identical to said first mentioned upstanding conduit and each having an upper end connected to said upper primary conduit and a lower end connected to one of said inlets of one of said drinker units.

3. A device according to claim 1, and further comprising a fresh water supply, fresh water conduit means connecting said fresh water supply to said reservoir for introducing fresh water therein, float valve means within said reservoir for sensing when the fluid level drops below a predetermined level in said reservoir, said float valve means being connected to said water conduit means and normally being in a closed position preventing introduction of water into said reservoir, said float valve being movable to an open position in response to drop of fluid below said predetermined level within said reservoir for permitting water to be introduced from said fresh water supply into said reservoir.

4. A device according to claim 3 and further comprising a pressure reducing valve in said fresh water conduit means for reducing water pressure from said water supply to a predetermined lower pressure.

5. A device according to claim 4 wherein said water conduit means comprises a first water conduit connecting said fresh water supply to said reservoir, and a second water conduit connecting said first water conduit to said first primary conduit, a first water valve being in said first water conduit and being selectively movable to open and closed positions to permit and to prevent, respectively, the flow of water through said first water conduit to said reservoir, a second water valve in said second water conduit and being selectively movable to open and closed positions to permit and to prevent, respectively, the flow of water through said second water conduit to said first primary water conduit.

6. A device according to claim 5 wherein a first primary valve is positioned within said first primary conduit and a second primary valve is within said second primary conduit, said first and second primary valves each being selectively movable between open and closed positions for alternatively permitting and preventing fluid flow through said first and second primary conduits, respectively.

7. A device according to claim 2 wherein each of said upstanding conduits include a gate valve which is selectively movable between open and closed positions to alternatively permit the opening and closing of said upstanding conduit to fluid flow.

8. A device according to claim 1 wherein said pump means is located outside said reservoir.

9. A device according to claim 8 comprising fan means operable to force fresh air over said pump means for cooling said pump means.

10. A device according to claim 1 wherein said animal actuatable valve means comprises a valve member extending through said fluid inlet, said valve member comprising a flat head on one side of said inlet and an upstanding pin extending through said inlet, an elastomeric O-ring surrounding said pin between said flat head and said valve opening; spring means yieldable urging said flat head toward said valve opening so as to compress said elastomeric ring; said valve member being tiltable to an open position about a fulcrum approximately at said valve opening in response to engagement by said animal, whereby said flat head will tilt and break said fluid seal and permit said fluid to pass from said upstanding conduit through said fluid inlet of said drinker unit.

11. A method for delivering nutritive fluid to a plurality of demand animal drinker units, each of said drinker units having a fluid container and an animal actuatable valve which is normally in a closed position and which is yieldably movable to an open position, said method comprising:

placing a quantity of said nutritive fluid in a reservoir;

pumping said fluid from said reservoir through a primary conduit means and back to said reservoir, said primary conduit means having an upper primary conduit positioned above said animal drinker units, a first primary conduit leading from said reservoir to said upper primary conduit, and a second primary conduit returning from said upper primary conduit to said reservoir;

connecting each of said animal actuatable valves of said drinker units in fluid communication with said upper primary conduit through an upstanding conduit having an upper end connected to said upper primary conduit and terminating in a lower end connected to said animal actuatable valve, whereby fluid passing through said upper primary conduit will fall by gravity from said upper primary conduit through said upstanding conduit to said animal actuatable valve;

permitting an animal to move said animal actuatable valve of at least one of said drinker units from said closed position, wherein said fluid is prevented from flowing through said upstanding conduit to said open position, wherein said fluid is permitted to flow through said upstanding conduit and said animal actuatable valve to said container of said drinker unit.

12. A method according to claim 11 and further comprising sensing the fluid level in said reservoir with a float valve, said float valve being connected to a water source, opening said float valve whenever said fluid level within said reservoir is below a predetermined level so as to cause fresh water to be introduced into said reservoir from said water source.

13. A method according to claim 11 and further comprising closing off said conduit means from said reservoir by closing a first primary valve located in said first primary conduit and by closing a second primary valve located in said second primary conduit; introducing water under pressure into said primary conduit between said first and second primary valves, whereby a closed water pressurized circuit is provided comprising said upper primary conduit and said plurality of upstanding conduits.

14. A method according to claim 11 comprising introducing water into said first primary conduit and draining said reservoir of fluid by opening a drain valve which is in fluid communication with said reservoir whereby said water will flush out said primary conduit means.

* * * * *